(12) United States Patent
Takami

(10) Patent No.: US 8,782,652 B2
(45) Date of Patent: Jul. 15, 2014

(54) CONTROL SERVER, VIRTUAL SERVER DISTRIBUTION METHOD

(75) Inventor: Hiroyuki Takami, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 296 days.

(21) Appl. No.: 13/297,840

(22) Filed: Nov. 16, 2011

(65) Prior Publication Data

US 2012/0066684 A1    Mar. 15, 2012

Related U.S. Application Data

(63) Continuation of application No. PCT/JP2009/002421, filed on Jun. 1, 2009.

(51) Int. Cl.
*G06F 9/46* (2006.01)

(52) U.S. Cl.
USPC ......................................................... 718/102

(58) Field of Classification Search
None
See application file for complete search history.

(56) References Cited

U.S. PATENT DOCUMENTS

| | | |
|---|---|---|
| 2003/0177241 A1 | 9/2003 | Katayama |
| 2005/0060590 A1 | 3/2005 | Bradley et al. |
| 2005/0080885 A1* | 4/2005 | Ahmed et al. ............... 709/223 |
| 2005/0108712 A1 | 5/2005 | Goyal |
| 2005/0120160 A1 | 6/2005 | Plouffe et al. |
| 2006/0195715 A1 | 8/2006 | Herington |
| 2009/0106409 A1 | 4/2009 | Murata |
| 2010/0030877 A1* | 2/2010 | Yanagisawa ................. 709/221 |
| 2010/0250734 A1* | 9/2010 | Ajiro ........................... 709/224 |

FOREIGN PATENT DOCUMENTS

| | | |
|---|---|---|
| JP | 2005-115653 | 4/2005 |
| JP | 2006-172241 | 6/2006 |
| JP | 2006-244481 | 9/2006 |
| JP | 2007-200347 | 8/2007 |
| JP | 2008-276320 | 11/2008 |
| JP | 2009-110347 | 5/2009 |
| JP | 2009-116852 | 5/2009 |
| WO | WO 2008/102739 A1 | 8/2008 |
| WO | WO 2009/037915 A1 | 3/2009 |

OTHER PUBLICATIONS

Extended European Search Report issued Apr. 3, 2013 in corresponding European Patent Application No. 09845469.7.
Japanese Office Action mailed Apr. 9, 2013 in corresponding Japanese Patent Application No. 2011-518062.
Korean Office Action mailed May 28, 2013 in corresponding Korean Application No. 10-2011-7028077.

(Continued)

*Primary Examiner* — Emerson Puente
*Assistant Examiner* — Sisley Kim
(74) *Attorney, Agent, or Firm* — Staas & Halsey LLP

(57) ABSTRACT

When plural virtual servers are distributed to plural physical servers, efficient distribution is performed in terms of the processing capacity of the physical servers and their power consumption. Firstly a second load of each virtual server in future is predicted based on a first load in a prescribed time period up to the present of each of the plural virtual servers. Next, the schedule is determined to distribute the plural virtual servers to the plural physical servers based on the second load of each virtual server so that a total of the second loads of one or a plurality of the virtual servers distributed to a physical server is within a prescribed range of proportion with respect to processing capacity of the physical server. Furthermore, the distribution is instructed (execution of redistribution) in accordance with the schedule.

12 Claims, 18 Drawing Sheets

(56) References Cited

OTHER PUBLICATIONS

Chinese Office Action mailed Jun. 4, 2013 in corresponding Chinese Application No. 200980159500.7.

International Search Report for PCT/JP2009/002421 mailed Aug. 18, 2009.

European Office Action mailed Jan. 13, 2014 in corresponding European Application No. 09845469.7.

* cited by examiner

| LOAD DATABASE | | |
|---|---|---|
| RECORD 1 | VIRTUAL SERVER ID (VM1) | LOAD DATA ▬ |
| RECORD 2 | VIRTUAL SERVER ID (VM2) | LOAD DATA ▬ |
| ... | | |
| RECORD m | VIRTUAL SERVER ID (VMm) | LOAD DATA ▬ |

22

| TIME | OPERATION INFORMATION | LOAD VALUE |
|---|---|---|
| YYY/MM/DD 9:10:00 | OPERATING | 30 |
| YYY/MM/DD 9:11:00 | OPERATING | 80 |
| YYY/MM/DD 9:12:00 | OPERATING | 20 |
| YYY/MM/DD 9:13:00 | OPERATING | 5 |
| YYY/MM/DD 9:14:00 | STOPPED | 0 |
| YYY/MM/DD 9:15:00 | STOPPED | 0 |
| ... | ... | ... |

FIG. 3

| PHYSICAL SERVER TABLE | | | | | |
|---|---|---|---|---|---|
| | RECORD 1 | ID INFORMATION (192.168.1.10) | PROCESSING CAPACITY VALUE (100) | FAILURE INFORMATION (NORMAL) | OPERATION INFORMATION (OPERATING) |
| | RECORD 2 | ID INFORMATION (192.168.1.11) | PROCESSING CAPACITY VALUE (100) | FAILURE INFORMATION (NORMAL) | OPERATION INFORMATION (STOPPED) |
| | ... | ... | ... | ... | ... |
| | RECORD n | ID INFORMATION (192.168.1.30) | PROCESSING CAPACITY VALUE (100) | FAILURE INFORMATION (FAILED) | OPERATION INFORMATION (STOPPED) |
| VIRTUAL SERVER TABLE | | | | | |
| | RECORD 1 | ID INFORMATION (192.168.2.10) | VIRTUAL SERVER ID (VM1) | VIRTUAL SERVER IMAGE (VM1MG_1.dat) | |
| | RECORD 2 | ID INFORMATION (192.168.2.11) | VIRTUAL SERVER ID (VM2) | VIRTUAL SERVER IMAGE (VM1MG_2.dat) | |
| | ... | ... | ... | ... | |
| | RECORD m | ID INFORMATION (192.168.2.100) | VIRTUAL SERVER ID (VMm) | VIRTUAL SERVER IMAGE (VM1MG_m.dat) | |

23

F I G. 4

| DAY (D) \ HOUR (H) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 0 | 92 | 86 | 0 | 0 | 0 | 0 | 0 | 0 | 37 | 85 | 69 | 2 | 11 | 2 | 88 | 84 | 0 | 25 | 87 | 21 | 46 | 10 | 63 | 9 |
| 1 | 22 | 59 | 0 | 0 | 0 | 0 | 0 | 0 | 65 | 53 | 13 | 70 | 64 | 23 | 49 | 62 | 56 | 26 | 68 | 79 | 1 | 52 | 27 | 95 |
| 2 | 66 | 28 | 0 | 0 | 0 | 0 | 0 | 0 | 32 | 84 | 74 | 33 | 13 | 59 | 84 | 18 | 43 | 61 | 24 | 30 | 45 | 86 | 22 | 83 |
| 3 | 21 | 33 | 0 | 0 | 0 | 0 | 0 | 0 | 74 | 40 | 77 | 72 | 6 | 17 | 75 | 34 | 51 | 33 | 52 | 64 | 40 | 5 | 1 | 41 |
| 4 | 0 | 0 | 0 | 0 | 0 | 0 | 0 | 0 | 53 | 76 | 25 | 16 | 45 | 64 | 57 | 40 | 57 | 50 | 12 | 19 | 97 | 96 | 64 | 57 |
| 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7 | 4 | 93 | 0 | 0 | 0 | 0 | 0 | 0 | 10 | 2 | 48 | 19 | 78 | 64 | 5 | 49 | 64 | 65 | 2 | 7 | 61 | 65 | 92 | 44 |
| 8 | 28 | 37 | 0 | 0 | 0 | 0 | 0 | 0 | 8 | 87 | 29 | 7 | 3 | 35 | 32 | 66 | 19 | 85 | 64 | 74 | 36 | 43 | 18 | 35 |
| 9 | 56 | 72 | 15 | 96 | 19 | 9 | 0 | 0 | 79 | 6 | 95 | 96 | 81 | 43 | 76 | 80 | 37 | 38 | 9 | 40 | 88 | 60 | 27 | 1 |
| 10 | 74 | 34 | 83 | 81 | 0 | 0 | 0 | 0 | 34 | 21 | 20 | 66 | 60 | 34 | 99 | 16 | 82 | 19 | 30 | 53 | 21 | 55 | 34 | 62 |
| 11 | 74 | 40 | 0 | 0 | 0 | 0 | 0 | 0 | 60 | 88 | 7 | 31 | 73 | 79 | 7 | 4 | 70 | 88 | 22 | 23 | 65 | 15 | 40 | 43 |
| 12 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 2 | 18 | 0 | 0 | 0 | 0 | 0 | 0 | 0 | 0 | 0 | 0 |
| 14 | 47 | 79 | 0 | 0 | 0 | 0 | 0 | 0 | 61 | 7 | 81 | 50 | 39 | 27 | 15 | 36 | 47 | 80 | 85 | 5 | 8 | 82 | 76 | 36 |
| 15 | 6 | 61 | 0 | 0 | 0 | 0 | 0 | 0 | 27 | 37 | 8 | 33 | 30 | 80 | 53 | 70 | 4 | 21 | 60 | 62 | 42 | 32 | 90 | 83 |
| 16 | 46 | 61 | 0 | 0 | 0 | 0 | 0 | 0 | 0 | 81 | 90 | 63 | 66 | 99 | 8 | 29 | 53 | 16 | 47 | 38 | 13 | 43 | 85 | 28 |
| 17 | 11 | 4 | 0 | 0 | 0 | 0 | 0 | 0 | 0 | 65 | 89 | 90 | 67 | 56 | 19 | 74 | 57 | 49 | 93 | 83 | 96 | 73 | 43 | 3 |
| 18 | 50 | 34 | 0 | 0 | 0 | 0 | 0 | 0 | 46 | 81 | 21 | 52 | 67 | 85 | 3 | 70 | 67 | 4 | 86 | 68 | 38 | 84 | 39 | 60 |
| 19 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 21 | 65 | 68 | 0 | 0 | 0 | 0 | 0 | 0 | 43 | 23 | 93 | 72 | 35 | 34 | 46 | 89 | 54 | 40 | 12 | 49 | 91 | 31 | 19 | 22 |
| 22 | 15 | 29 | 79 | 0 | 0 | 0 | 0 | 0 | 16 | 35 | 66 | 42 | 8 | 31 | 10 | 13 | 56 | 36 | 29 | 5 | 17 | 89 | 19 | 90 |
| 23 | 52 | 79 | 0 | 0 | 0 | 0 | 0 | 0 | 9 | 51 | 10 | 44 | 8 | 62 | 44 | 52 | 0 | 2 | 79 | 51 | 55 | 65 | 85 | 24 |
| 24 | 59 | 1 | 0 | 0 | 0 | 0 | 0 | 0 | 0 | 99 | 71 | 43 | 44 | 52 | 97 | 25 | 92 | 84 | 56 | 3 | 11 | 74 | 97 | 5 |
| 25 | 82 | 24 | 0 | 0 | 0 | 0 | 0 | 0 | 35 | 65 | 10 | 83 | 15 | 93 | 53 | 83 | 47 | 78 | 84 | 89 | 88 | 89 | 41 | 92 |
| 26 | 0 | 0 | 0 | 0 | 0 | 0 | 0 | 0 | 0 | 0 | 0 | 0 | 43 | 29 | 76 | 87 | 77 | 49 | 37 | 0 | 0 | 0 | 0 | 0 |
| 27 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 28 | 66 | 75 | 0 | 0 | 0 | 0 | 0 | 0 | 77 | 67 | 2 | 37 | 50 | 2 | 76 | 85 | 58 | 84 | 64 | 58 | 29 | 34 | 25 | 44 |
| 29 | 41 | 66 | 0 | 0 | 0 | 0 | 0 | 0 | 63 | 35 | 42 | 43 | 27 | 57 | 64 | 7 | 86 | 69 | 40 | 47 | 42 | 73 | 89 | 69 |
| 30 | 0 | 0 | 0 | 0 | 0 | 0 | 0 | 0 | 2 | 70 | 8 | 44 | 95 | 68 | 0 | 0 | 65 | 19 | 72 | 37 | 99 | 82 | 32 | 37 |

Rows 0–6 indicated as 168 HOUR CYCLE.

F I G. 7

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | HOUR (H) |
|---|---|---|---|---|---|---|---|---|---|---|---|---|---|---|---|---|---|---|---|---|---|---|---|---|---|
| 0 | 52 | 82 | 0 | 0 | 0 | 0 | 0 | 29 | 17 | 77 | 53 | 39 | 34 | 17 | 66 | 62 | 46 | 31 | 37 | 45 | 56 | 49 | 41 | 33 | |
| 1 | 18 | 47 | 0 | 0 | 0 | 0 | 0 | 29 | 53 | 29 | 38 | 26 | 42 | 36 | 53 | 34 | 42 | 55 | 55 | 24 | 54 | 39 | 76 | 71 | |
| 2 | 55 | 60 | 0 | 0 | 0 | 0 | 0 | 30 | 56 | 67 | 59 | 42 | 66 | 53 | 45 | 33 | 29 | 40 | 40 | 50 | 69 | 55 | 34 | 56 | |
| 3 | 41 | 18 | 0 | 0 | 0 | 0 | 0 | 27 | 56 | 64 | 68 | 44 | 40 | 73 | 37 | 71 | 46 | 58 | 51 | 42 | 52 | 44 | 28 | 36 | |
| 4 | 52 | 25 | 0 | 0 | 0 | 0 | 0 | 49 | 78 | 16 | 46 | 50 | 80 | 30 | 49 | 60 | 55 | 51 | 50 | 72 | 71 | 46 | 63 | 13 | |
| 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | |
| 6 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | |

F I G. 8

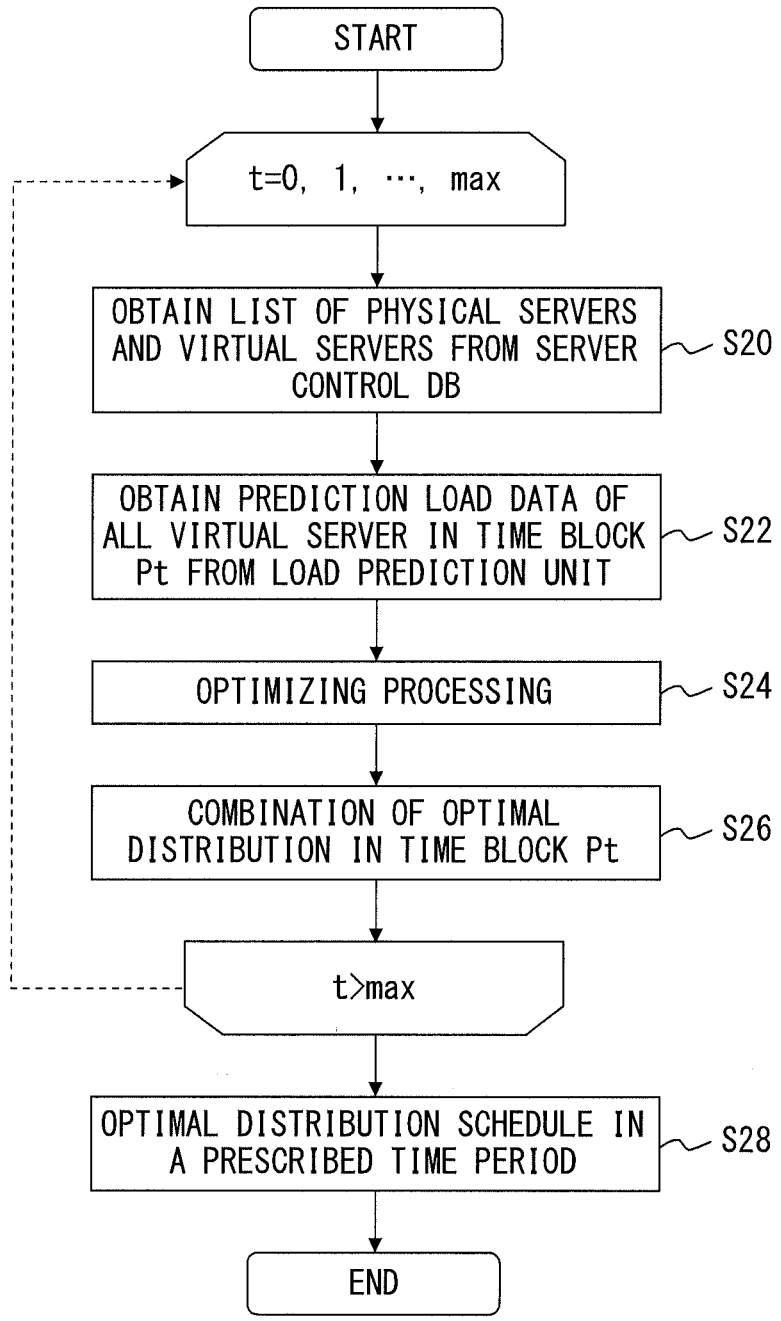
F I G. 1 1

| DISTRIBUTION SCHEDULE | |
|---|---|
| TIME | DISTRIBUTION LIST |
| YYYY/MM/DD 10:00:00 | $P_1(V_1,V_4,V_7,V_{10},V_{12}), P_2(V_2,V_5,V_8,V_{13}), P_3(V_3,V_6,V_9,V_{11})$ |
| YYYY/MM/DD 11:00:00 | $P_1(V_2,V_1,V_7,V_{10},V_{11}), P_2(V_3,V_5,V_8,V_{13}), P_3(V_4,V_6,V_9)$ |
| YYYY/MM/DD 12:00:00 | $P_1(V_2,V_1,V_7,V_{10},V_{11}), P_2(V_3,V_5,V_8,V_9), P_3(V_4,V_6,V_{13})$ |
| YYYY/MM/DD 13:00:00 | $P_1(V_2,V_1,V_7), P_2(V_3,V_5,V_8,V_{13}), P_3(V_4,V_6,V_9), P_4(V_{10},V_{11})$ |
| ... | |

FIG. 13

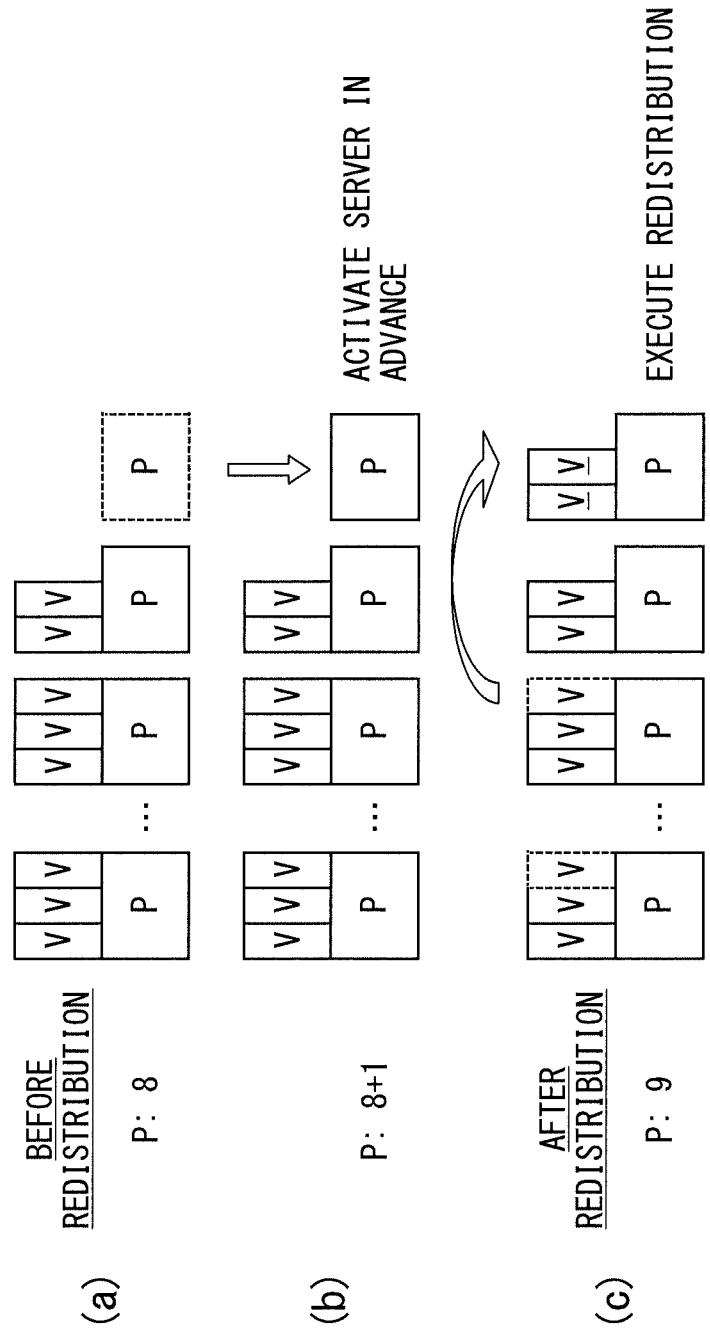
F I G. 14

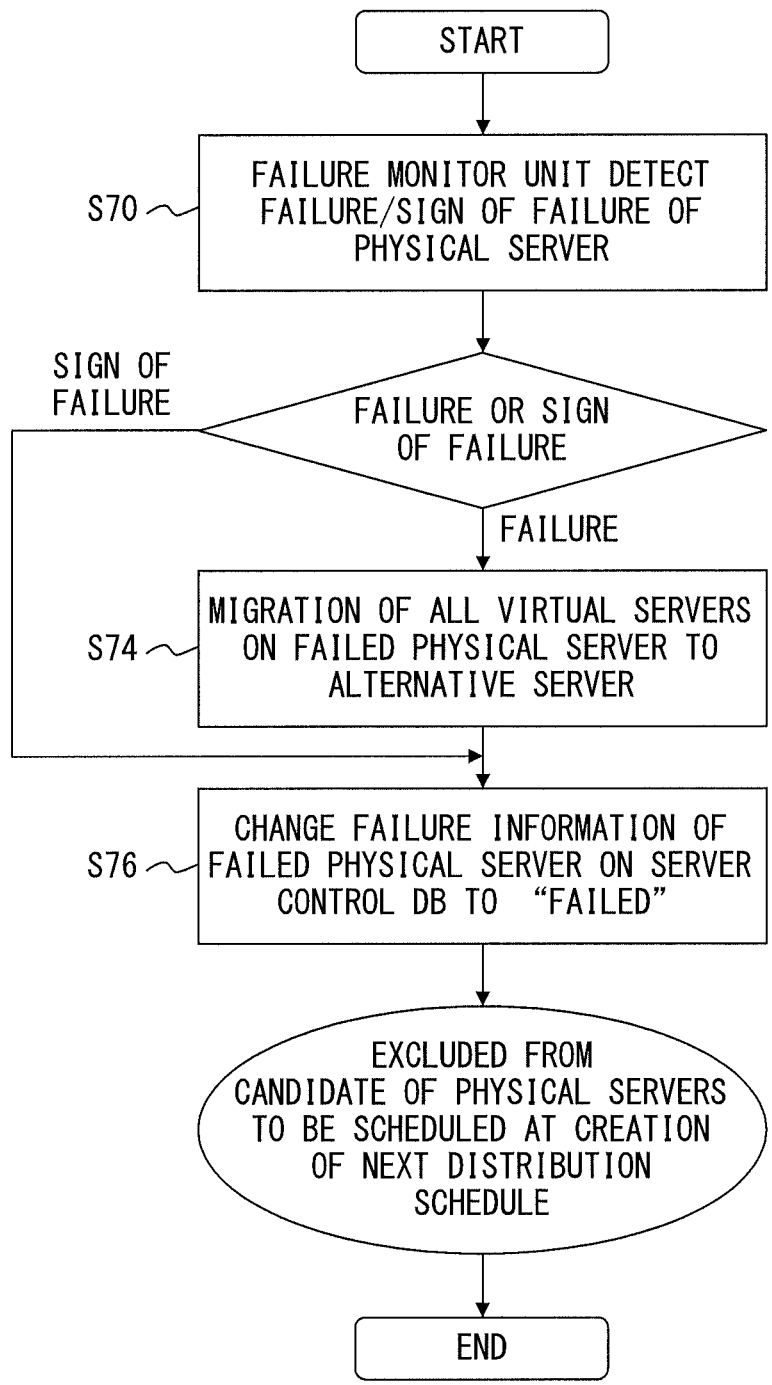
F I G. 1 7

US 8,782,652 B2

CONTROL SERVER, VIRTUAL SERVER DISTRIBUTION METHOD

CROSS REFERENCE TO RELATED APPLICATION(S)

This application is a continuation of PCT application PCT/JP2009/002421, which was filed on Jun. 1, 2009.

FIELD

The present invention relates to a technology of virtual computing that causes plural virtual servers to operate on plural physical servers and more specifically to scheduling in distribution of the virtual servers to the physical servers.

BACKGROUND

With the development of a virtual server technology in recent years, technologies of causing plural virtual servers on a physical server and of moving the virtual servers in operation between different physical servers (online migration) have been available. The migration is described in Patent Document 1, for example.

Patent Document 1: Japanese Laid-open Patent Publication No. 2006-244481

SUMMARY

When the load of plural virtual servers to be distributed is too low with respect to the total of the performance obtained from one or plural physical servers in running, the operation of the physical servers is wasted. In other words, in this case, it is inefficient in terms of the power consumption of the running physical servers.

On the contrary, when the load of plural virtual servers to be distributed is too high with respect to the total of the performance obtained from one or plural physical servers in running, the running physical servers have little available capacity and are likely to fail to respond to the abrupt increase in the load of the virtual servers, causing delay in processing time period.

Considering this, one aspect of the present invention intends to provide a server control program, a control server, and a virtual server distribution method for efficient distribution in distributing plural virtual servers to plural physical servers in terms of the processing capacity of the physical servers and their power consumption.

According to the first aspect, a server control program to distribute plural virtual servers to plural physical servers is provided. This server control program is a program to cause a computer to execute (A) predicting a second load of each of the virtual servers in future based on a first load of each of the plurality of virtual servers in a prescribed time period up to the present;

(B) determining a schedule to distribute the plurality of virtual servers to the plurality of physical servers based on the second load of each of the virtual servers so that a total of the second loads of one or a plurality of the virtual servers distributed to a physical server is within a prescribed range of proportion with respect to processing capacity of the physical server; and (C) issuing an instruction to distribute a portion or all of the plurality of virtual servers to a portion or all of the plurality of physical servers according to the schedule. A virtual server distribution method of the similar aspect executed by a control server is also provided.

According to the second aspect, a control server to distribute plural virtual servers to plural physical servers is provided. This control server includes (D) a load prediction unit to predict a second load of each of the virtual servers in future based on a first load of each of the plurality of virtual servers in a prescribed time period up to the present;

(E) a schedule creation unit to determine a schedule to distribute the plurality of virtual servers to the plurality of physical servers based on the second load of each of the virtual servers so that a total of the second loads of one or a plurality of the virtual servers distributed to a physical server is within a prescribed range of proportion with respect to processing capacity of the physical server;

(F) a distribution execution unit to issue an instruction to distribute a portion or all of the plurality of virtual servers to a portion or all of the plurality of physical servers according to the schedule.

In distributing plural virtual servers to plural physical servers, it is possible to perform efficient distribution in terms of the processing capacity of the physical servers and their power consumption.

BRIEF DESCRIPTION OF DRAWINGS

FIG. 3 illustrates an example of the data structure of the load database in a control server of an embodiment;

FIG. 4 illustrates an example of content in the server control database in the control server of an embodiment;

FIG. 7 is a diagram that has an example of load values on an hourly basis added to FIG. 6;

FIG. 8 is a diagram illustrating a prediction example of load values of every hour of 168 hours (one week);

FIG. 11 is a flowchart of the processing of the optimal distribution creation unit in the control server of an embodiment;

FIG. 13 illustrates an example of a distribution schedule in the control server of an embodiment;

FIG. 14 is a diagram illustrating an example of redistribution execution in the control server of an embodiment;

FIG. 17 is a flowchart illustrating processing of a case in which a failure or failure prognosis occurs in a physical server in the control server of an embodiment.

DESCRIPTION OF EMBODIMENTS (1) System Configuration

In the following description, the entire configuration of a network system (hereinafter referred to as "system") including a control server according to an embodiment is explained with reference to FIG. 1.

Figure 1:
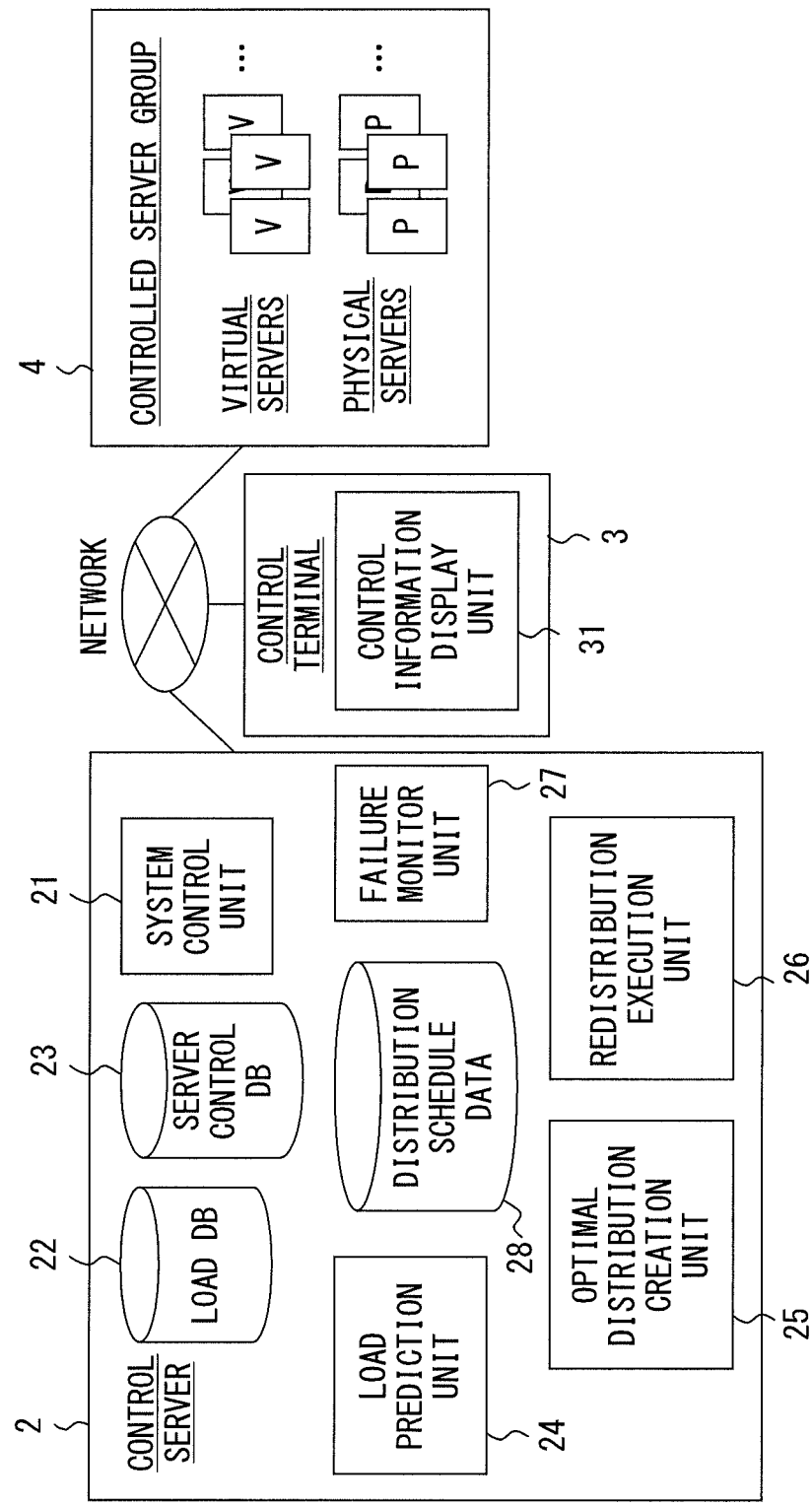
FIG. 1 is a block diagram illustrating a configuration of the entire system in an embodiment.

As illustrated in FIG. 1, this system has a control server 2, a control terminal 3, and a controlled server group 4 connected through a network. In this system, the control server 2 takes a control so that one or plural virtual servers are distributed for each of the physical servers in the controlled server group 4. At that time, this control intends efficient distribution of the virtual servers in view of the processing capacity of the physical servers and their power consumption.

As illustrated in FIG. 1, the controlled server group 4 includes plural virtual servers (indicated by "V" in FIG. 1) and plural physical servers (indicated by "P" in FIG. 1), and is a group of servers to be controlled by the control server 2 over the network. Here, the physical servers are platforms that cause the virtual servers to operate, and include computer hardware and virtual server control software such as hypervisors.

The virtual servers are servers realized on the physical servers in the manner of software. One or more tasks (applications) run on the virtual servers. In some cases, plural virtual servers carrying out different tasks may be combined and distributed on a physical server, or plural virtual servers carrying out an identical task may be distributed on different physical servers.

It should be noted that the data of the virtual servers may be stored in a disk device directly connected to the physical servers, or may be stored in a shared disk (such as SAN (Storage Area Network), NFS (Network File System), and iSCSI (Internet Sall Computer System Interface) that is present separately from the physical servers and is connected over a network or by a direct wire connection. In addition, the type of the physical medium of the disk in which the data of the virtual servers is stored is not limited.

Although the control server 2 can communicate with the controlled server group 4 over a network, the control server 2 is present independently of the controlled server group 4, and controls so as to unify the entire system.

As illustrated in FIG. 1, the control server 2 includes a system control unit 21, a load database (load DB) 22, a server control database (server control DB) 23, a load prediction unit 24, an optimal distribution creation unit 25 (schedule creation unit), a redistribution execution unit 26 (distribution execution unit), a failure monitor unit 27, and a distribution schedule data storage unit 28. Each of these components of the control server 2 maybe stored in a physically single server, or may be present in plural servers for each component.

The control terminal 3 is a client including a control information display unit 31. The control terminal 3 is connected to the control server 2 directly or over a network. FIG. 1 illustrates an example in which the control terminal 3 is connected with the control server 2 over the network. It should be noted that the control information display unit 31 may be implemented in the control terminal 3 or may be implemented in the control server 2. FIG. 1 illustrates an example in which the control information display unit 31 is implemented in the control terminal 3.

(2) Configuration of Control Server

Next, details of each of the components of the control server 2 illustrated in FIG. 1 are explained.

[System Control Unit 21]

The system control unit 21 is mainly composed of microcontrollers, and performs regulation of the entire control server 2, control of each database, and transmission of commands to each unit of the control server 2. When the control server 2 is composed of plural computers, the system control unit 21 unifies all of the computers. In addition, the system control unit 21 performs reception of a request from the control terminal 3, and transmission of data to be displayed in the control terminal 3 in response to the request.

[Load Database 22]

Previous load data of each virtual server is accumulated in the load database 22.

Here, the load data includes a load value of each virtual server and information on an operation state (running or stopped) of each virtual server (hereinafter referred to as "operation information").

The load value included in the load data can be any value as long as the value is an index that can be compared with a processing capacity value described later. The load value may be, for example, utilization relating to the resources of a computer such as a CPU, a memory and a disk, an index value synthesizing these resources, or a benchmark value of computing capability necessary to execute a certain number of tasks.

A route when the load data is accumulated in the load database 22, a method of the accumulation, and a timing of the accumulation are not limited. The route when the load data is accumulated in the load database 22 is discussed as an example. An agent may be provided on the virtual server side and the agent has functions of measuring the load data and of regularly transmitting the load data to the control server 2, or a manager may be provided to regularly obtain the load data to each virtual server from the control server 2. The load data may be transmitted to the control server 2 through a hypervisor operating on the physical server and controlling virtual servers or through an interface of the physical server.

Figure 2:
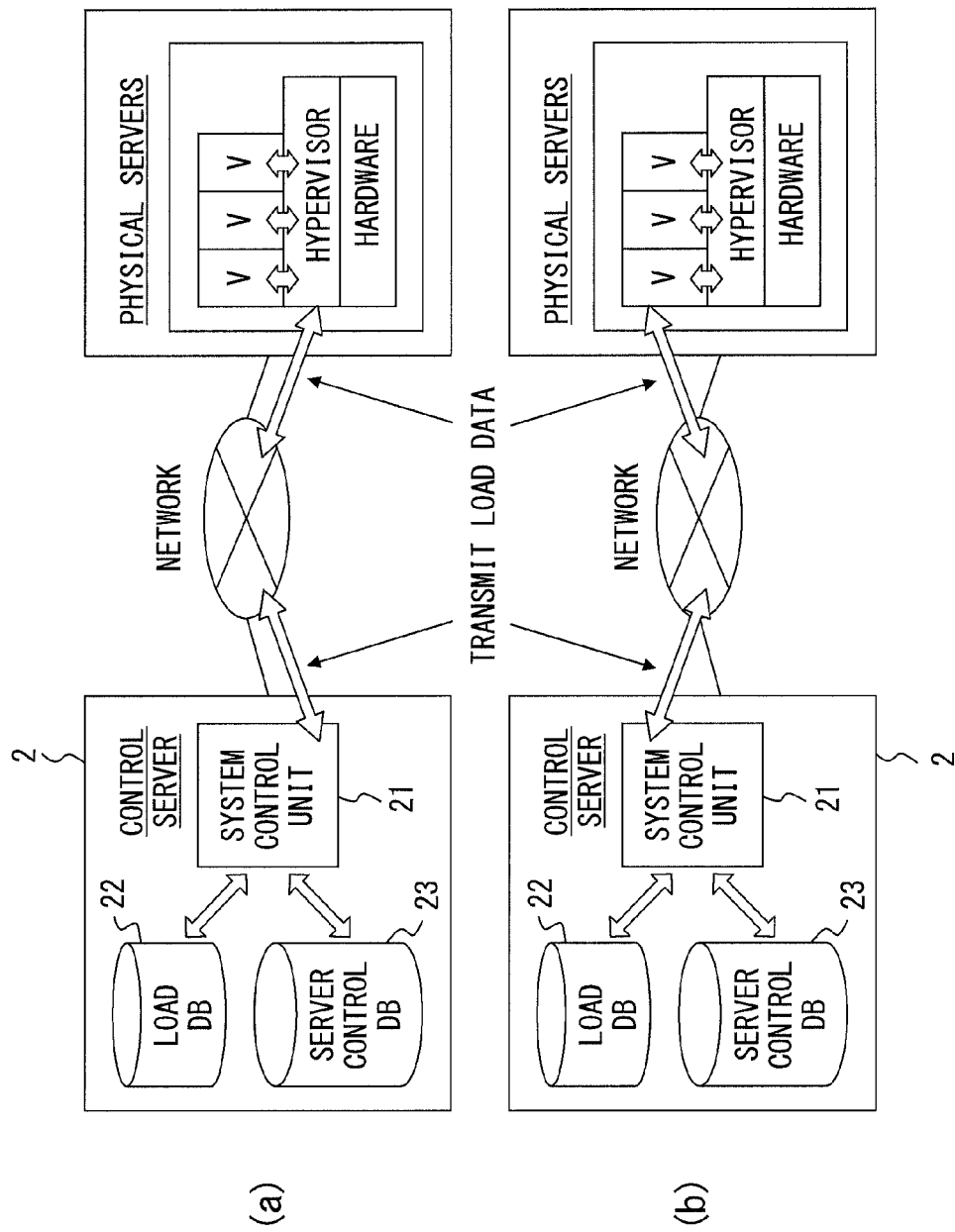
FIG. 2 is a diagram illustrating an example of a route on which the load data is transmitted in this system.

FIG. 2 is a diagram illustrating an example of a route on which the load data is transmitted in this system.

In the example illustrated in FIG. 2(a), the system control unit 21 makes an inquiry at the server control database 23 to obtain information on the virtual servers that are load data obtaining targets (e.g., specific information indicating a location on a network such as a virtual server ID or an IP address). Based on the information of the virtual server, the system control unit 21 makes an inquiry at the hypervisor on the physical server in which the target virtual server is operating through a network. In the example illustrated in FIG. 2(a), the hypervisor has a mechanism to read the load data of the virtual servers and returns the load data of the target virtual server in response to the inquiry from the system control unit 21. The system control unit 21 that obtained the load data of the target virtual servers records the load data in a record of corresponding virtual servers ID of the load database 22. By repeating the above processing for all of the virtual servers, load data of all virtual servers at a certain point in time can be obtained. By repeatedly executing this data obtaining processing periodically, such as on a minute-by-minute basis, the load data is accumulated in the load database 22.

The example illustrated in FIG. 2(b), unlike FIG. 2(a), illustrates a case in which an agent for transmitting the load data is provided on the virtual servers. At that time, the agent on the virtual servers transmits the load data directly to the control server 2 without going through the hypervisor. The system control unit 21 that received the load data checks the virtual server that transmitted the load data against the server control database 23, and records the virtual server in a record of the virtual server ID of the load database 21.

It should be noted that in FIG. 1 and FIG. 2, explanations are provided under an assumption that the load database 22 and the server control database 23 are present as separate databases. However, these databases may be configured as a single data base (a single table).

The load value included in the load data recorded periodically in the load database 22 may be an instantaneous value (one sample), an average value (average of plural samples), or a total value (a total value of plural samples). When the load data to be recorded on the basis of the plural samples is determined, the number of the samples is not particularly limited. Furthermore, the intervals of obtaining the load data (period of the above) are set to at least intervals shorter than the intervals required for load prediction described later.

As described above, the load data recorded in the load database 22 includes not only the load value of each of the virtual servers but also operation information of each of the virtual servers. This operation information is utilized to calculate an accurate prediction value in consideration of stopped periods of the virtual servers in the load prediction described later.

In the example illustrated in FIG. 2(a), when the system control unit 21 makes an inquiry at the hypervisor, the system control unit 21 obtains the operation information of the target virtual servers together with the load value, and the load data including the load value and the operation information is recorded in the load database 22.

In the example illustrated in FIG. 2(b), the virtual server or the hypervisor notifies the system control unit 21 of a change of the operating state of the virtual servers at the time of the virtual servers being started or being stopped. On the basis of this notification, the system control unit 21 records the operation information of the virtual server in the load database 22.

FIG. 3 illustrates an example of the data structure of the load database 22.

In FIG. 3, virtual server IDs (VM1, VM2, . . . , VMm) and the load data of the corresponding virtual servers are recorded in the load database 22 in association with plural records (records 1, 2, . . . , m). The virtual server ID is information to associate the virtual servers on the load database 22 with the virtual servers on the server control database 23. As illustrated in FIG. 3, the load data includes the load value and the operation information of a virtual server for each point in time of obtaining the load data. FIG. 3 illustrates an example of recording actual points in time for each minute as an example of the recording time points of the load data. However, it is not necessary to record the actual points in time. Offsets from the recording start time may be recorded, or texts that can specify the recording time may be recorded.

[Server Control Database 23]

The server control database 23 records a list of physical servers and their processing capacity and a list of virtual servers. The data of the physical servers and the data of the virtual servers may be present as independent databases as long as the databases are accessible from the control server.

The processing capacity value of each physical server is an index value indicating the performance relating to processing capacity (or computing capacity) of each physical server, and can be any value as long as it can be compared with the load value described above. The processing capacity value may be a value indicating resources of a computer such as a CPU, a memory, or a disk (computing speed and memory capacity), or an index value synthesizing these resources.

FIG. 4 illustrates an example of content included in tables (physical server table and virtual server table) of the server control database 23. Here, a quantity n of physical servers and a quantity m of virtual servers are to be controlled. It should be noted that the number of the virtual servers is larger than the number of the physical servers in general (m>n).

Identification (ID) information (e.g. addresses) and the processing capacity values of a quantity n of physical servers corresponding to the record 1 to n are included in the physical server table. As illustrated in FIG. 4, the physical server table further includes failure information and operation information corresponding to each of the records. The failure information of the physical servers is information of whether the physical server is in a normal condition or not (indicating "normal" or "failed"). The operation information of physical servers is information relating to the operation state of the physical servers (indicating "running" or "stopped"). The failure information and/or operation information is useful to identify scheduled physical servers when a distribution schedule that is described later is created.

Identification information, the virtual server ID, and the image data of the virtual servers of the quantity m of physical servers corresponding to the record 1 to m are included in the virtual server table. The identification information is information to uniquely identify the physical servers or virtual servers within the control server 2 so as to be accessible to the servers, and computer names and addresses on a network are the examples. In FIG. 4, addresses are illustrated as an example of the identification information. The virtual server ID is used to associate the virtual servers with the records on the load database 22.

In the server control database 23 in FIG. 4, the data structure illustrated in FIG. 4 is only an example, and the structure may have a proper addition of information necessary to control the physical servers and/or virtual servers.

[Load Prediction Unit 24]

The load prediction unit 24 operates in accordance with a load prediction algorithm described later, and performs prediction of the future load values (load prediction) in a specific period of time in a specific virtual server based on the load data in the past. In the load prediction, the load values and the operation information included in the load data of each of the virtual servers from the load database 22 are references for a certain period to some extent (e.g. one week or one months), or for the entire period of time. In the following description, the predicted load value (second load) is arbitrarily referred to as "load prediction value". Details of the load prediction algorithm are explained later.

[Optimal Distribution Creation Unit 25]

The optimal distribution creation unit 25 functioning as a schedule creation unit operates in accordance with an optimal distribution creation algorithm described later, and creates an optimal distribution schedule of the virtual servers with respect to the physical servers based on the load value predicted by the load prediction unit 24. Here, "optimal distribution" is defined that a total of the load values predicted from plural virtual servers distributed on a physical server is within a range of appropriate proportions (acceptable range) with respect to the processing capacity value of the physical server. The upper limit of the acceptable range is provided to give a margin of tolerance for an abrupt increase in a load of the virtual servers, and the lower limit of the acceptable range is provided to reduce power consumption by utilizing the performance of the physical server without any waste and by minimizing the number of physical servers to be operated.

The optimal distribution creation unit 25, when it creates a distribution schedule, refers respectively to the server control database 23 and the load prediction unit 24. The optimal distribution creation algorithm is explained later in more detail.

[Redistribution Execution Unit 26]

The redistribution execution unit 26 performs redistribution of virtual servers in accordance with the distribution schedule created by the optimal distribution creation unit 25. The redistribution execution unit 26 includes an interface to issue an instruction of migration. An interface provided by virtual server control software such as a hypervisor is mainly used for this interface.

A method of migration to execute the redistribution is not limited.

The redistribution execution unit 26 executes offline migration when a virtual server to be migrated is under suspension, but when the virtual server to be migrated is in operation, the redistribution execution unit 26 may stop the operation of the virtual server to execute the offline migration. Moreover, the redistribution execution unit 26 may execute online migration when the virtual server to be migrated is in running.

The redistribution execution unit 26 includes an interface that can instruct turning on and off of the power of a physical server, and an interface that can instruct migration of the virtual server.

The redistribution execution unit 26 causes a physical server with zero virtual servers as a result of execution of the redistribution to turn off the power. If a new physical server needs to be activated as a result of execution of the redistribution, the redistribution execution unit 26 activates the physical server. Furthermore, the redistribution execution unit 26, when the physical server fails (when the failure information indicates "failed"), causes the physical server to turn off the power, and activates another physical server. The interface used for turning on and off the power may be an interface provided in the physical server itself, control software provided by a vendor of the physical server, a common tool, or a unique implementation. The protocols and the control channels in the interface are not limited.

It should be noted that in executing the redistribution, if a physical server to server as a buffer is needed at the time of online migration, a temporarily non-operating physical server may be activated.

Furthermore, the instruction of turning on/off the power of the physical server and the instruction of the migration of the virtual server from the redistribution execution unit 26 may be made through any protocols. Examples of the protocols are SNMP (Simple Network Management Protocol), IPMI (Intelligent Platform Management Interface), and SMASH-CLP (System Management Architecture for Server Hardware Command Line Protocol).

[Failure Monitor Unit 27]

The failure monitor unit 27 monitors the state of each physical server (normal/failed) and, when a failure occurs, rewrites the failure information of the record corresponding to the physical server on the server control database 23 as "failed". When the failed physical server is recovered, the failure monitor unit 27 rewrites the failure information of the record corresponding to the physical server to "normal".

[Distribution Schedule Data Storage Unit 28]

The distribution schedule data storage unit 28 stores the distribution schedule created by the optimal distribution creation unit 25. The redistribution execution unit 26 refers to the distribution schedule stored in the distribution schedule data storage unit 28 to execute redistribution. It should be noted that the distribution schedule is periodically updated.

(3) Configuration of Control Terminal

Next, the components in the control terminal 3 illustrated in FIG. 1 are further explained.

[Control Information Display Unit 31]

The control information display unit 31 displays various information including operation information of the system based on the data provided from the control server 2. The information displayed in the control information display unit 31 includes, for example, the following information.

Figure 5:
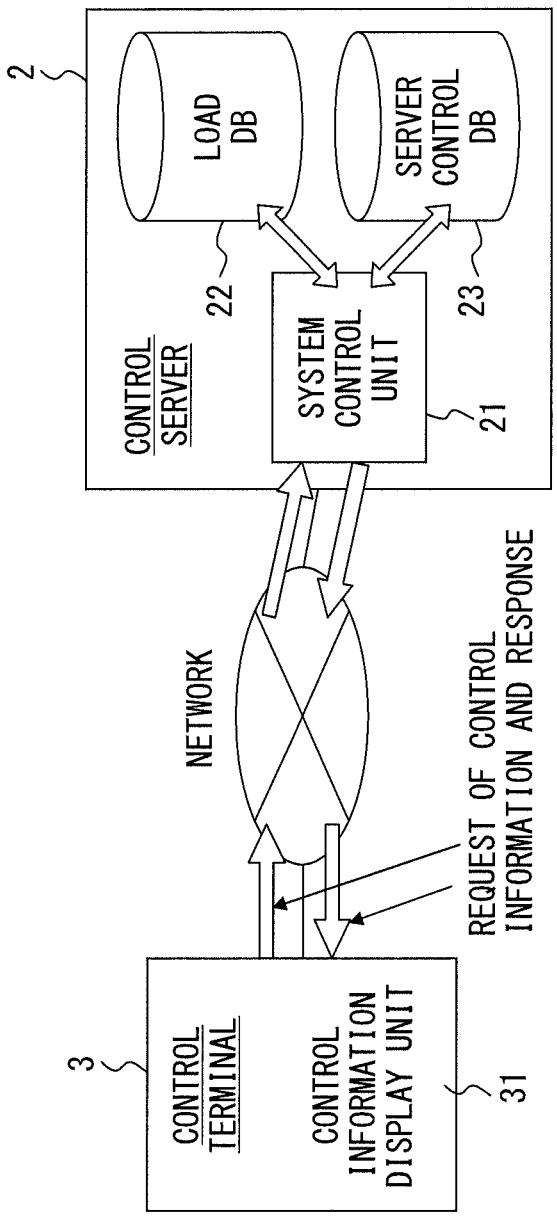
FIG. 5 is a diagram illustrating a mode of transmitting a request of control information from a control terminal to the control server of an embodiment and receiving the response.

Details and List of physical servers and virtual servers
Virtual server load data (load value, operation information)
Virtual server load prediction value
Distribution schedule of the virtual servers
Current distribution status of virtual servers FIG. 5 is a diagram illustrating a mode of transmitting a request of the control information from the control terminal 3 to the control server 2 and receiving the response. In FIG. 5, in the control server 2 that received the request of the control information, the system control unit 21 refers to the load database 22 or the server control database 23, extracts the control information relating to the request, and transmits the control information to the control terminal 3. The control terminal 3 causes the control information display unit 31 to display the control information received as the response from the control server 2. As a result, the control information is visible to a system manager operating the control terminal 3, for example.

(4) Load Prediction Algorithm

Next, an example of a load prediction algorithm implemented in the load prediction unit 24 of the control server 2 is explained in detail with reference to FIG. 6 to FIG. 9.

In the load prediction algorithm, firstly, to calculate a load prediction value (second load) of each virtual server in the future, whether each of the virtual servers is a server that operates 24 hours a day or a server having a stopped time period (or operating period) is analyzed. If it is a server having a stopped time period, the stopped time period is predicted.

A typical virtual server that has a stopped time period is, for example, a virtual server that is used in a method of utilization in which the server does not perform its tasks during weekends or at night. When the stopped time periods are scheduled, the load prediction algorithm can directly use the schedule of the stopped time periods as the prediction value of the stopped time periods. In this case, a system administrator may register the operation schedule of the virtual server in the server control database 23 in advance.

When the stopped time periods are not scheduled, the load prediction algorithm predicts (calculates) the stopped time period by analyzing operation information (information in the load database 22; see FIG. 3) with respect to a prescribed time block each day (one particular hour) for several weeks. This analysis is conduced by calculating the percentage of time that the virtual server is operating within a particular time block in a day (operation percentage) based on the operation information of the virtual server, for example, and determining that that particular time block is a stopped time period under the condition that the operation percentage is at a prescribed threshold or below. The operation information that is the basis of the calculation of the stopped time period may be on a daily, weekly, or monthly basis, or combinations of those.

It should be noted that the reason to make a distinction between the operating time period and the stopped time period in the load prediction algorithm is that if an average of the load values during the entire time period is calculated, the calculated average value would include the stopped time periods, and this would be smaller than the average of the load values during running and does not match the actual situation.

Figure 6:
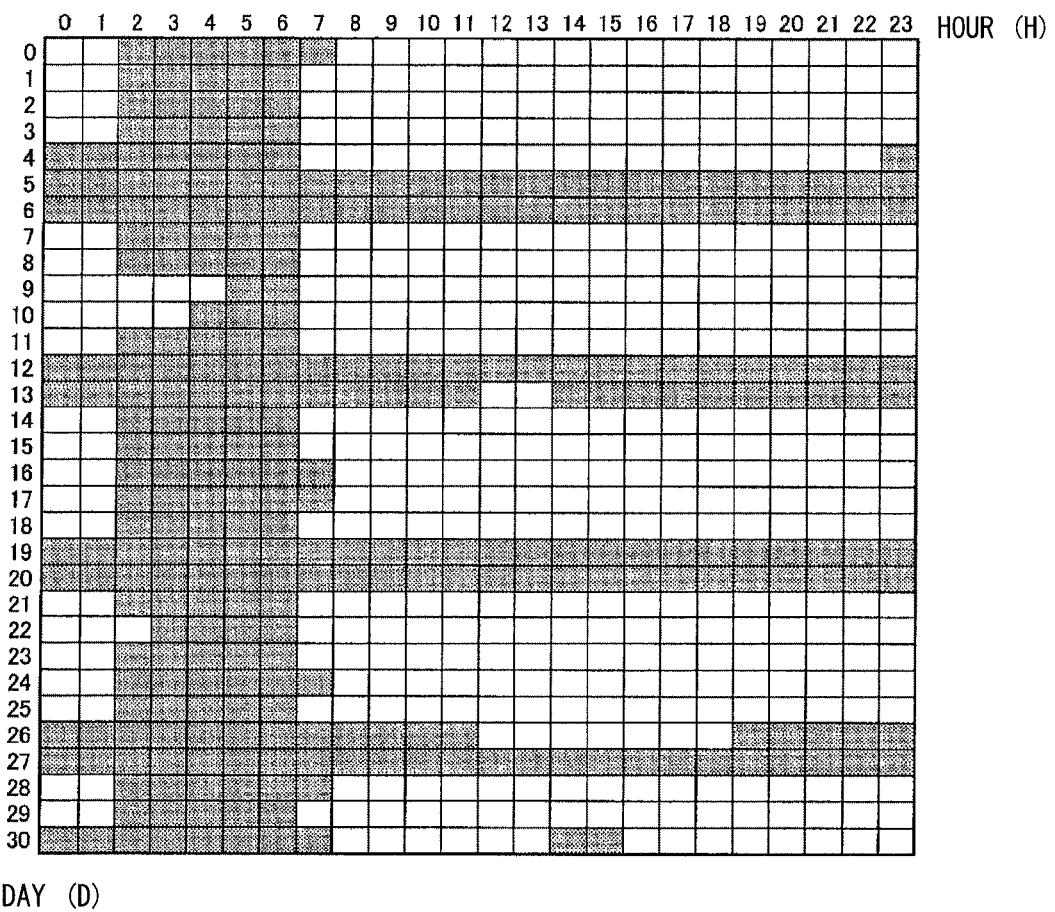
FIG. 6 is a diagram illustrating an example of a prediction result (the operation time period or the stopped time period) on an hourly basis within a month.

In the manner described above, it is possible to predict whether a given time period is the operation time period or the stopped time period on an hour-to-hour basis during one month. FIG. 6 is a diagram illustrating an example of a prediction result (the operation time period or the stopped time period) on an hourly basis within a month. FIG. 6 illustrates an example of a matrix having 0 to 23 hours on an hourly basis on a horizontal axis and 0 to 30 days in units of days on a vertical axis, and the time periods represented by gray indicate the stopped time period of the virtual server and the time periods represented by white indicate the operating time period of the virtual server.

The load prediction algorithm may predict non-business days, business days, and working hours of a particular virtual server based on hourly data illustrated in FIG. 6. In the following description, one hour of the operating time period and one hour of the stopped time period are referred to as an operating hour and a stopped hour, respectively.

The load prediction algorithm determines that a day in which operation hours of a virtual server are below a prescribed threshold (e.g., 30%) is a "nonbusiness day" of the virtual server. If this nonbusiness day occurs periodically every seven days, it can be predicted that Saturdays and Sundays are the nonbusiness days of this virtual server, and the virtual server will not operate on Saturdays and Sundays in the future. In contrast, the load prediction algorithm determines that a day in which operation hours of a virtual server are above a prescribed threshold (e.g., 30%) are a "business day" of the virtual server.

Furthermore, the load prediction algorithm determines that a particular hour of a day is "nonbusiness hours" when the number of days in which the particular hour of a day is operating hours from among business days in one month is below a threshold (e.g., 30%). In the example of FIG. 6, for example, this virtual server has nonbusiness hours from 2 a.m. to 6 a.m. and it can be predicted that this virtual server will not operate from 2 a.m. to 6 a.m. in the future. In addition, the load prediction algorithm determines that a particular hour of a day is "working hours" when the number of days in which the particular hour of a day is operating hours from among business days in one month is over a threshold (e.g., 30%).

In the load prediction algorithm, it is preferable to execute a prediction method of the load value of the virtual server, as described below, involving only the business hours in the business days of the virtual server.

Next, the prediction method of the load value by means of the load prediction algorithm is explained. FIG. 7 is a diagram that has an example of load values on an hourly basis added to FIG. 6. In the example of FIG. 7, the load values in the stopped time period of the virtual server, which is represented by gray, are all zero.

In the following description, a method is described in which the load prediction algorithm predicts load values sequentially in cycles having a duration of 168 hours (one week). In this method, the load values for one week are predicted by executing the moving average processing of the load values in each hour every week for the past several weeks, for example, using data of the past 10 weeks (load value data in a 168-hour cycle×10). At that time, with a focus on a particular single hour of each day for ten weeks, whether the particular single hour was an operating hour or a stopped hour is taken into account in the average processing. For example, with a focus on a particular single hour, if the particular hour was an operating hour in seven out of the ten weeks (a stopped hour in three of the ten weeks), a value obtained by dividing the total value of the load values for seven hours that were operating hours by 7 is a load prediction value of the particular single hour. By executing this moving average processing, load values of every hour in future 168-hour periods (one week) are predicted every week. An example of prediction of load values of every hour for 168 hours (one week) is provided in FIG. 8.

It should be noted that the above method of sequentially predicting the load values by moving average processing for a prescribed time period is only an example, and that other statistical processing (e.g., processing that takes the standard deviation into account) and/or other methods (of setting of cycles, or of setting of time periods) to obtain data (sample) for the basis of the prediction calculation may be used.

Figure 9:
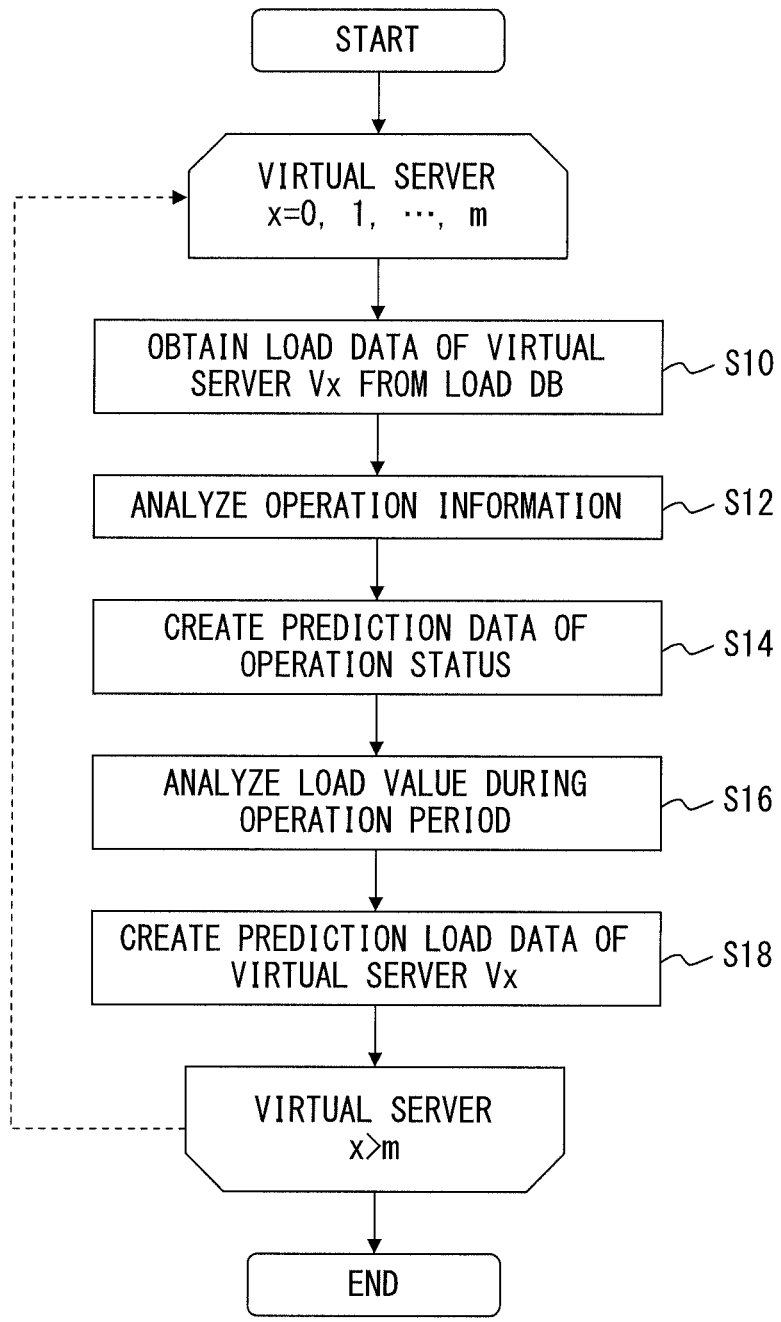
FIG. 9 is a flowchart of prediction processing of the load values in accordance with a load prediction algorithm in the control server of an embodiment.

Next, with reference to the flowchart in FIG. 9, the load value prediction processing executed in the load prediction unit 24 in accordance with the load prediction algorithm is explained. In FIG. 9, the processing in steps S10 to S18 is executed on each of a quantity m of the virtual servers Vx (x=0, 1, . . . , m).

Firstly, the load prediction unit 24, with reference to the load database 22, obtains load data (load values and operation information) of the virtual servers Vx for ten weeks, for example (step S10), and analyzes the operation information of the obtained virtual servers Vx (step S12). In other words, since the status of, for example, the virtual server (operating or stopped) at one-minute intervals can be found from the obtained operation information (see FIG. 3), the load prediction unit 24 can calculate the operation percentage of the virtual servers Vx of a particular time block of a day. The load prediction unit 24 determines that the particular time block is a stopped hour under the condition that the operation percentage is at a prescribed threshold or below, and determines that the particular time period is an operating hour under the condition that the operation percentage is at a prescribed threshold or above. As a result of this analysis, the load prediction unit 24 generates prediction data of the operation status as illustrated in FIG. 6 (steps S14), for example. In addition, the load prediction unit 24 analyzes load values in the operation time period (operation hours on an hourly basis) (step S16). More specifically, the load prediction unit 24 averages the load value at one-minute intervals obtained in step S10 within each operation hour and calculates the load values in the operation hour. As a result, matrix data (e.g., data for ten weeks) illustrated in FIG. 7 as an example can be obtained. The load prediction unit 24 averages the load values of the operation hour for ten weeks and obtains the prediction load data during the operation hour (step S18). At this time, as described above, if a particular single hour is an operation hour in seven out of the ten weeks (a stopped hour in three of the ten weeks), a value obtained by dividing the total of the load values for seven hours that are operation hours by 7 is the load prediction value of the particular single hour. It should be noted that the prediction load data includes information of stopped hours as well as the load prediction values.

By executing the processing illustrated in FIG. 9 every week, for example, the prediction load data on a weekly basis is generated for all virtual servers.

(5) Optimal Distribution Creation Algorithm

Next, details of the optimal distribution creation algorithm implemented in the optimal distribution creation unit 25 of the control server 2 are explained with reference to FIG. 10 to FIG. 13.

The optimal distribution creation unit 25 obtains the prediction load data of all virtual servers within each time block for one week in the future, for example, from the load prediction unit 24. The timing to obtain the prediction load data is not specifically limited, but the timing may be at intervals longer than the intervals of the sample timings of the load data (one minute in FIG. 3).

The optimal distribution creation algorithm determines the schedule to distribute plural virtual servers to plural physical servers based on the load prediction values of each of the virtual servers so that the total of the load prediction values of one or plural virtual servers distributed to a physical server is within a prescribed range of proportion (acceptable range) with respect to the processing capacity of the physical server. The upper limit of the acceptable range is set to give a margin to tolerate an abrupt increase in the load of the virtual servers, and the lower limit of the acceptable range is set to reduce power consumption by utilizing the performance of the physical server without any waste and by minimizing the number of physical servers to be operated. For example, an appropriate value of the prescribed proportion is set to 70%, and the upper limit of the acceptable range is set to 80%, and the lower limit is set to 60%.

Figure 10:
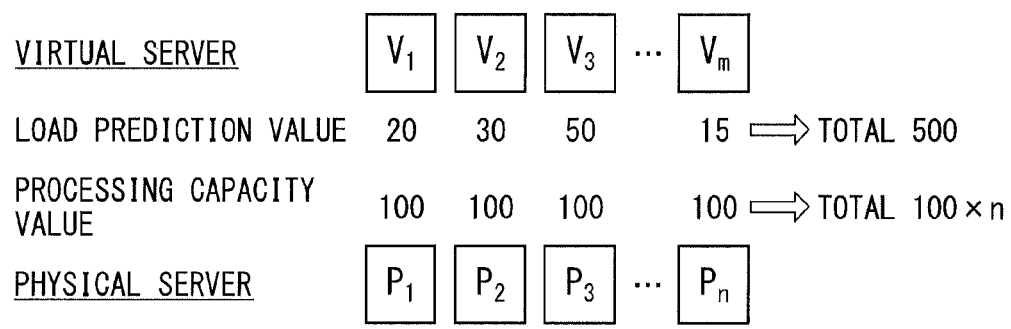
FIG. 10 illustrates an example of load prediction values of each virtual server and processing capacity values of the physical server in a particular time block.

By using examples of numerical values of the above range of proportion (appropriate value: 70%, acceptable range: 60 to 80%), a detailed method of determining schedules is explained below with reference to FIG. 10. FIG. 10 illustrates an example of load prediction values of the virtual servers V1 to Vm and the processing capacity value of the physical servers P1 to Pn in a particular time block. The load prediction value and the processing capacity value illustrated in FIG. 10 are only an example for explanation, and these two values are index values that can be compared.

As illustrated in FIG. 10, the example assumes that the processing capacity value of each of the physical servers is 100, and the total of the load prediction values of plural virtual server to be distributed is 500. If the number of physical servers required for operating all of the virtual servers is N, then the smallest integer N where the in equation 100×N× 70%≥500 is true is the minimum number of servers required. In this case, N≥7.14 is obtained and at least eight physical servers are required. Here, the performance of all physical servers is assumed to be the same. However, when the performance is not the same, the left-hand side value may be a value that is a total of the physical server performance multiplied by 0.7.

In the example illustrated in FIG. 10, the optimal distribution creation algorithm allocates virtual servers to the eight physical servers ($P_1, P_2, \ldots, P_8$) in a descending order of the load prediction value. More specifically, the optimal distribution creation algorithm sequentially allocates the virtual servers in a manner of the first virtual server $V_1$ to the physical server $P_1$, the second virtual server $V_2$ to the physical server $P_2, \ldots$, the eighth virtual server $V_8$ to the physical server $P_8$, the ninth virtual server $V_9$ to the physical server $P_1, \ldots$, the sixteenth virtual server to the physical server $P_8$. At that time, when the total value of the load prediction values of a virtual server to be allocated exceeds 80, a value obtained by multiplying the processing capacity value 100 of the physical server by the upper limit 80% of the appropriate range, the virtual server is not allocated to this physical server, but is allocated to the next physical server. If the virtual server cannot be allocated to the next physical server, and cannot eventually be allocated to the eighth physical server $P_8$, the ninth physical server $P_9$ is newly provided to allocate the virtual server. In this manner, the optimal distribution creation algorithm allocates all of the virtual servers and a distribution schedule is created in a particular time block.

Figure 12:
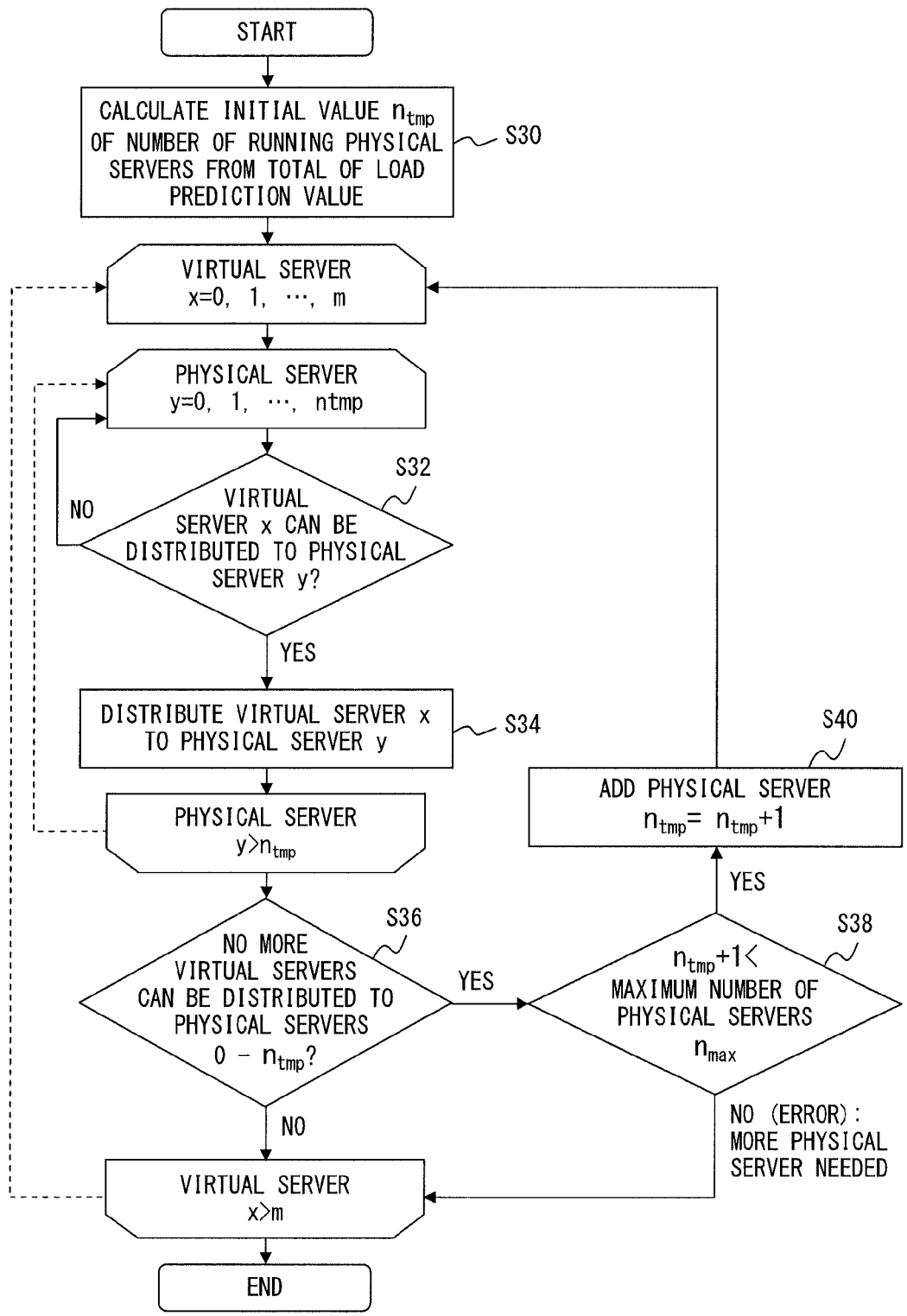
FIG. 12 is a flowchart of the optimizing processing in FIG. 11.

Next, with reference to the flowcharts in FIG. 11 and FIG. 12, the creation processing of the distribution schedule executed in the optimal distribution creation unit 25 in accordance with the optimal distribution creation algorithm is explained. It should be noted that FIG. 11 is a flowchart of the processing of the optimal distribution creation unit 25 and FIG. 12 is a flowchart of the optimizing processing in FIG. 11 (a flowchart of the above-described optimal distribution creation algorithm).

In FIG. 11, the processing in steps S20 to S26 is executed on all time blocks Pt (t=0, 1, . . . , max) for one week in the future, for example.

The optimal distribution creation unit 25, firstly, refers to the server control database 23 and obtains a list of physical servers and virtual servers (step S20). As a result, the virtual server ID of the virtual servers to be distributed and the processing capacity value of physical servers can be obtained (see FIG. 4). Next, the optimal distribution creation unit 25 obtains prediction load data (load prediction values, data of stopped hours) of all virtual servers within the time block Pt from the load prediction unit 24 (step S22). Since the load prediction value of all virtual servers to be distributed and the processing capacity values of the physical servers are obtained within the time block Pt as a result of steps S20 and S22, the optimizing processing is executed in accordance with the above-described optimal distribution creation algorithm (step S24).

With reference to FIG. 12, this optimizing processing is executed as below.

In other words, firstly, based the total of the load prediction values obtained in step S22 in FIG. 11 and the processing capacity value of the physical server in running obtained in FIG. 20, the initial value $n_{tmp}$ of the minimum required number of physical servers is calculated (step S30). Afterwards, steps S32, S34, and S36 are executed on all virtual servers x (x=0, 1, . . . , m) to be distributed in the time block Pt and a number $n_{tmp}$ of physical servers y (y=0, 1, . . . , $n_{tmp}$). In steps S32 and S34, processing is performed to allocate each of the virtual servers sequentially to the physical server one by one. In step S32, the judgment of whether the virtual server x can be distributed to the physical server y or not is based on whether the total of the load prediction values of the virtual servers distributed to the physical server is within a range of a prescribed proportion with respect to the processing capacity of the physical server or not.

In step S36, if no more virtual servers can be distributed to the physical servers 0 to $n_{tmp}$, or in other words, if the range of the prescribed proportion (acceptable range) is not satisfied by the number of physical servers determined in step S30, under the condition that the physical server can be added (step S38), one physical server to be distributed is added (step S40), and the processing is continued.

The explanation returns to the explanation of FIG. 11.

When the optimizing processing is executed in FIG. 11, the combination of the optimal distribution in the time block Pt (combination of each physical server and vertical servers distributed to each physical server) is determined (step S26). By executing steps S20 to S26 on all time blocks, a distribution schedule on an hourly basis for one week in the future, for example, is created (step S28). An example of this distribution schedule is illustrated in FIG. 13. The example of FIG. 13 represents that virtual servers $V_1$, $V_4$, $V_7$, $V_{10}$, and $V_{12}$ are distributed to the physical server Plat a point in time 10:00:00 of the date YYYY/MM/DD, for example. The distribution schedule is stored in the distribution schedule data storage unit 28 as distribution schedule data.

(6) Processing in Redistribution Execution Unit

Next, the processing in the redistribution execution unit 26 of the control server 2 is explained with reference to FIG. 14 to FIG. 16.

The processing executed by the redistribution execution unit 26 includes the following three types of processing (processing 6A, 6B, and 6C) of the time blocks to undergo redistribution (referred to as "target time block").

[Processing 6A]

The distribution schedule data of the target time block is loaded. In addition, a query on the server control database 23 about the information of the physical servers and the virtual servers is performed.

[Processing 6B]

The physical server operating in the target time block is compared with the physical server operating in the previous time block (one hour before) of the target time block. No particular processing is executed to the physical server that matches (i.e., a physical server operating in both of the time blocks), but an instruction to turn on or off the power is given to the physical server that does not match (i.e., a physical server operating in either one of the time blocks). Here, when the number of the physical servers increases in the target time block, the power is turned on prior to the distribution of the virtual servers in the target time block. When the number of physical servers decreases during the target time block, the power disconnection of a physical server stopped during the target time block is carried out in a state in which the virtual servers distributed to the physical server are moved to another physical server and none of the virtual servers operates on the physical server.

[Processing 6C]

Similarly to the processing 6B, a physical server to which virtual servers are distributed in the target time block is compared with the same physical server in the previous time block. As a result, no processing is executed on the virtual servers distributed to the physical server that matches, but the virtual servers that do not match are given migration instructions.

In both the processing 6B and the processing 6C, the comparison between the target time block and the previous time block of the target time block is performed by comparing the distribution schedule data loaded in the processing 6A. Another method of the comparison may include a method of obtaining information on the real-time operation status. The latter method makes it possible to take into account the unscheduled operation of a system administrator or the failure of the physical server.

Figure 15:
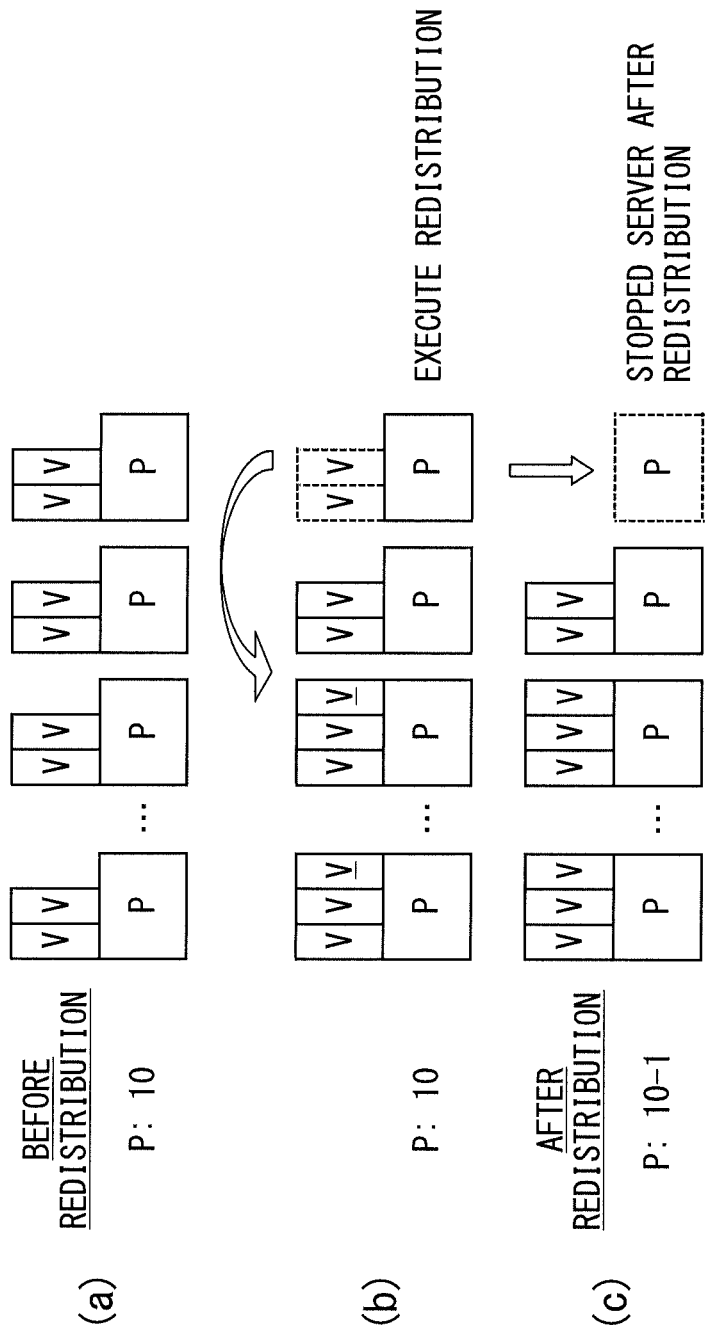
FIG. 15 is a diagram illustrating an example of redistribution execution in the control server of an embodiment.

FIG. 14 and FIG. 15 illustrate an example of execution of redistribution.

The example of FIG. 14 assumes a case in which eight physical servers are in operation before the redistribution, as illustrated in (a). At that time, if it is found from the distribution schedule data that the schedule requires nine physical servers, the redistribution execution unit 26 instructs turning on of the power of another physical server before the redistribution as illustrated in (b). The reschedule execution unit 26 also instructs performing of migration of the virtual servers to the newly turned-on physical server as illustrated in (c).

Next, redistribution processing executed by the redistribution execution unit 26 to a particular time block (target time block) is explained with reference to the flowchart in FIG. 16.

Figure 16:
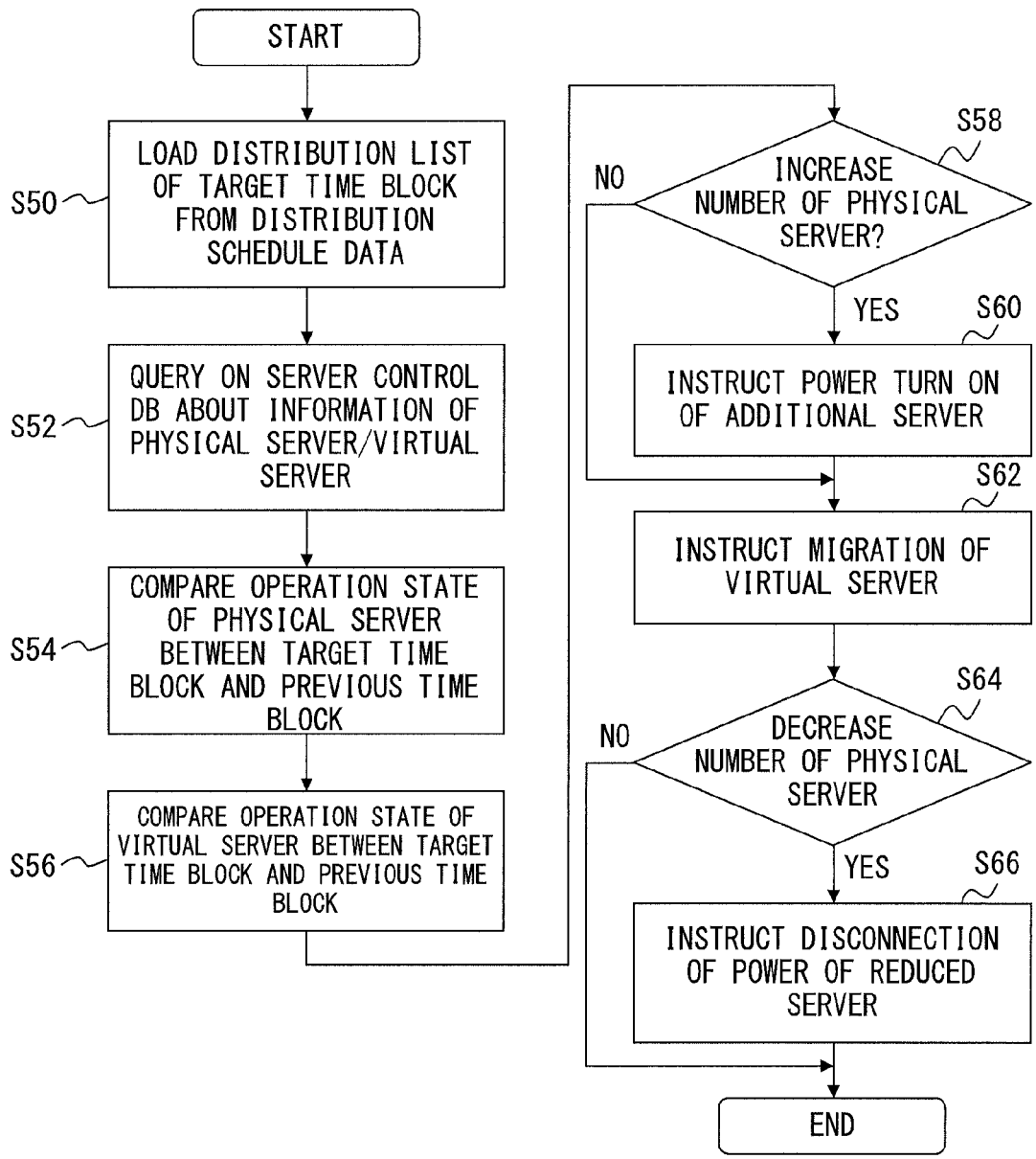
FIG. 16 is a flowchart of the redistribution processing in the control server of an embodiment.

In FIG. 16, firstly, the redistribution execution unit 26 reads out the distribution schedule data stored in the distribution schedule data storage unit 28, and loads a distribution list (data of a list of which physical server the virtual servers are distributed to) in the target time block from the distribution schedule data (step S50). The redistribution execution unit 26 performs a query about operation information (information indicating either an "operating" or "stopped" state) of the physical server and the virtual servers on the server control database 23 (step S52). The redistribution execution unit 26 compares the operation states of each of the physical servers in the target time block and the previous time block based on the operation information obtained in step S52, and finds out the change in the operation state of each physical server (step S54). Moreover, the redistribution execution unit 26 compares the operation states of each of the virtual servers in the target time block and in the previous time block and finds out the change in the operation states of each of the virtual servers (step S56).

The redistribution execution unit 26, when the number of the physical servers needs to be increased (YES in step S58) between the target time block and the previous time block, instructs the power of a newly added physical server to be turned on (step S60), but does nothing when the number of the physical servers does not need to be increased. The redistribution execution unit 26 instructs the virtual servers to be migrated in accordance with the distribution schedule data read out in step S50 (step S62). In contrast, when the number of the physical servers needs to be decreased between the target time block and the previous time block (YES in step S64), the redistribution execution unit 26 instructs power disconnection of the physical server to be decreased (step S66), but does nothing when the number of the physical servers does not need to be decreased.

In the above description, the redistribution processing is explained with reference to the flowchart. It is preferable for the execution of the redistribution to provide a scheduler to detect the time to start the processing of the target time block. This scheduler may be provided in the system control unit 21 or in the redistribution execution unit 26. When the scheduler is provided in the system control unit 21, an instruction to start the processing is issued to the redistribution execution unit 26 at the processing start time.

Furthermore, since overhead (network load etc.) relating to the redistribution processing occurs regardless of the redistribution processing being performed either online or offline, the optimal distribution creation unit 25 preferably implements an algorithm to create a distribution schedule that takes into account reduction of this overhead to the minimum.

(7) Processing at the Time of Failure and Recovery of Physical Server

Next, processing at the time of failure of the physical server and at the time of its recovery is explained as preferable processing of the control server 2 of the present embodiment.

When the failure occurs in the physical server, it is preferable to move the virtual servers of the failed physical server to another physical server. More specifically, the failure monitor unit 27 monitors the state (normal/failed) of each physical server, and rewrites the failure information of the record corresponding to the physical server on the server control database 23 to "failed" when a failure occurs (when a physical server is immediately stopped). At the same time, the redistribution execution unit 26 performs automatic recovery by activating an alternative physical server and causing migration of the virtual servers in response to the change in the failure information of the physical server on the server control database 23. The optimal distribution creation unit 25, based on the change in the failure information of the physical server on the server control database 23, excludes the failed physical server from the physical servers to be scheduled.

When a sign of failure rather than an actual failure is found in a physical server, processing to switch the physical server with the sign of failure to another physical server is not performed immediately. However, it is preferable that the failure monitor unit 27 rewrite the failure information of the record corresponding to the physical server with the sign of failure to "failed" on the server control database 23. As a result, the physical server with the sign of failure is excluded from the physical server to be scheduled at the time of creating the next distribution schedule.

It should be noted that the sign of failure here refers to events that are likely to lead to failure if it is left neglected, such as an abnormality in the number of rotations of the cooling fan in the server and correctable errors occurring more than a certain number of times in a given period of time.

Moreover, when the physical server is recovered to the normal state by maintenance and replacement, the failure monitor unit 27 rewrites the failure information of the corresponding physical server in the server control database 23 to "normal". As a result, in the optimal distribution creation unit 25, the recovered physical server is incorporated into the physical servers to be scheduled at the time of creating the next distribution schedule.

Next, processing at the time of failure of the physical server and processing at the time of its recovery are explained with reference to flowcharts of FIG. 17 and FIG. 18, respectively. FIG. 17 is a flowchart illustrating processing of a case in which a failure or a sign of failure occurs in a physical server, and FIG. 18 is a flowchart illustrating processing of a case in which the physical server is recovered to the normal state by maintenance, replacement, or the like.

In FIG. 17, firstly, the failure monitor unit 27 monitors each physical server to detect a failure/sign of failure of a physical server (step S70). When a failure occurs in a physical server (step S72), the redistribution execution unit 26 issues an instruction to perform migration of all the virtual servers distributed to the failed physical server to an alternative physical server (step S74). When a signal of failure of a physical server is detected in step S72, step S74 is not executed. In addition, the failure monitor unit 27 rewrites the failure information of the physical server in which a failure or a sign of failure is detected to "failed" in the server control database 23 (step S76). As a result, the optimal distribution creation unit 25 excludes the physical server in which a failure or a sign of failure is detected from candidates of operating physical servers that are physical server candidates to be scheduled at the time of creating the next distribution schedule.

Figure 18:
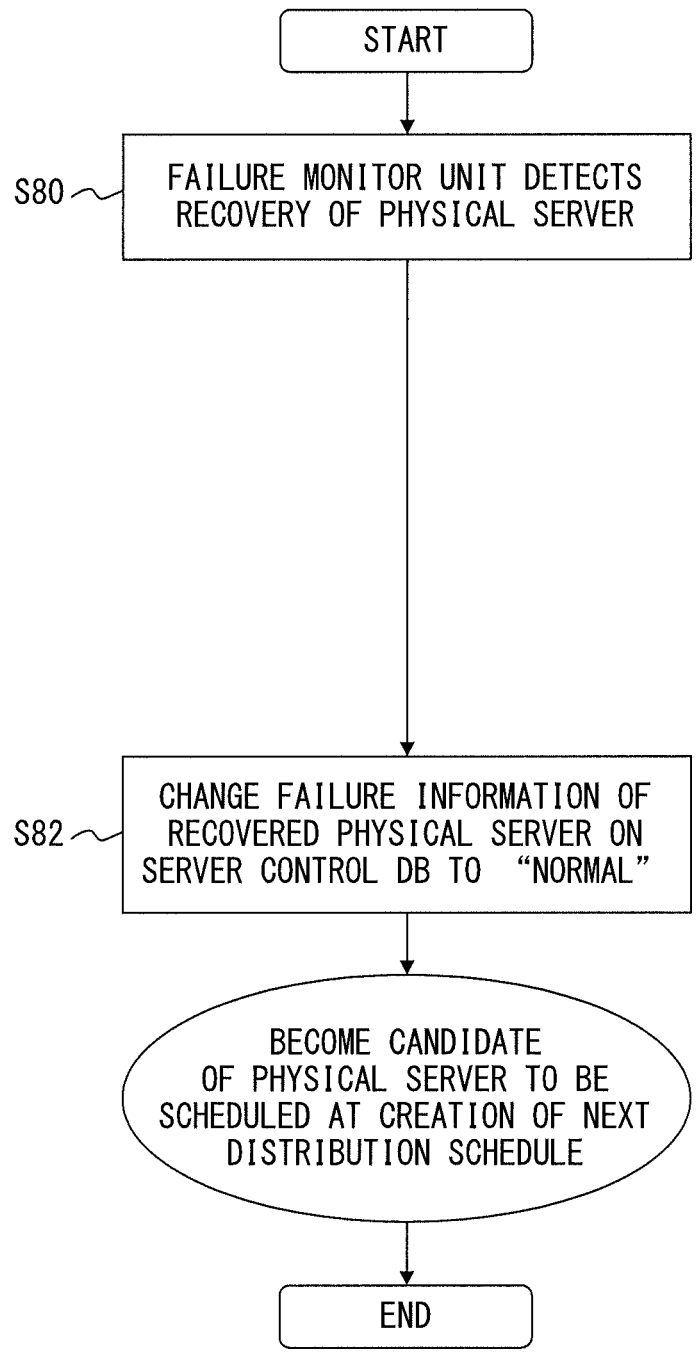
FIG. 18 is a flowchart illustrating processing of a case in which the physical server is recovered to the normal state by maintenance and replacement in the control server of an embodiment.

In FIG. 18, firstly, the failure monitor unit 27 monitors each physical server to detect recovery of the physical server (step S80). The failure monitor unit 27 rewrites the failure information of the physical server from which the recovery is detected to "normal" in the server control database 23 (step S82). As a result, the optimal distribution creation unit 25 incorporates the recovered physical server into candidates of the physical server to be scheduled at the time of creating the next distribution schedule.

It should be noted that the above-described optimal distribution creation algorithm (processing of the optimal distribution creation unit 25) is explained using a case in which a distribution schedule for one week in the future is created in advance. However, when a failure or a sign of failure occurs in a physical server incorporated into the distribution schedule, a schedule is recreated excluding the physical server in which the failure or the sign of failure occurred in the subsequent time blocks. At that time, if there is another physical server that has the same processing capacity as that of the physical server in which a failure or a sign of failure occurred and that is not incorporated into the distribution schedule, the recreation of the schedule can be skipped by replacing the physical server in which a failure or a sign of failure occurred with this physical server.

Methods of failure detection (recovery) in physical servers performed by the failure monitor unit 27 are not limited in particular, but possible methods include, for example, a method in which events from monitor software provided from a vendor of the physical servers is used as a trigger, a method in which the failure monitor unit 27 collects information relating to the state of physical servers through communications with each physical server, and a method in which information relating to the state of physical servers is obtained and updated from input operations of an operator.

As explained above, according to the control server of the present embodiment, a load prediction value is calculated from the past load data of each of plural virtual servers, an optimal distribution schedule of the virtual servers to a physical server is created, and redistribution is periodically executed. In this distribution schedule, the total of the load values predicted from plural virtual servers distributed on a particular physical server is within a range of appropriate proportion with respect to the processing capacity value of the particular physical server. This gives, as a result, a margin of tolerance for an abrupt increase in a load of the virtual servers, and reduces power consumption by utilizing the performance of the physical server without any waste and by minimizing the number of physical servers to be operated, eventually reducing carbon-dioxide emissions.

Furthermore, since creation of the distribution schedule and execution of redistribution are performed automatically without the need for manpower, operation and maintenance costs can be kept low.

In the above description, details of the control server and its system according to some embodiments are explained. However, the control server according to embodiments of the present invention is not limited to the above embodiments, but it is obviously possible to make various improvements and modifications within a scope that does not depart from the gist of the present invention.

In relation to the operation of each of the components of the control server according to the above embodiments, a virtual server distribution method executed by this control server is disclosed.

According to this virtual server distribution method, the future load values of each virtual server (load prediction values) are predicted on the basis of the load values of each of plural virtual servers in a prescribed time period up to the present, a schedule to distribute the plural virtual servers to plural physical servers is determined based on the load prediction values of each virtual server so that the total of the load prediction value of one or plural virtual servers distributed in a physical server is within a prescribed range of proportion with respect to the processing capacity of the physical server, and an instruction is issued to distribute a portion or all of the plural virtual servers to a portion or all of plural physical servers in accordance with the schedule.

The operations of each of the components of the control server according to the above embodiments or the above virtual server distribution method can be realized by programs. In this case, by causing a microcontroller (computer) included in the system control unit 21, for example, to execute a server control program in which procedures of the above virtual server distribution method are written, the above-described virtual server distribution method is realized by using hardware resources of each of the components including the load prediction unit 24, the optimal distribution creation unit 25, the distribution schedule data storage unit 28, and the redistribution execution unit 26. In addition, the above program may be incorporated in advance into the control server as firmware or may be executed by the control server as versatile software.

In addition, according to an embodiment, the functions of the units included in the control server 2 (such as the system control unit 21, the load database 22, the server control database 23, the load prediction unit 24, the optimal distribution creation unit 25, the redistribution execution unit 26, the failure monitor unit 27, and the distribution schedule data storage unit 28) and of the control information display unit 31 included in the control terminal 3 may be realized by causing a processor such as a microcontroller to execute a prescribed program. For example, the microcontroller included in the control server 2 may function as the system control unit 21, the load database 22, the server control database 23, the load prediction unit 24, the optimal distribution creation unit 25, the redistribution execution unit 26, the failure monitor unit 27, and the distribution schedule data storage unit 28 as a result of executing the program stored in a medium such as a memory or a disk. Moreover, information, such as the load database 22, the server control database 23, and the like may be stored in a medium such as a memory or a disk.

Explanation of Codes

2 . . . control server, 21 . . . system control unit, 22 . . . load database, 23 . . . server control database, 24 . . . load prediction unit, 25 . . . optimal distribution creation unit, 26 . . . redistribution execution unit, 27 . . . failure monitor unit, 28 . . . distribution schedule data storage unit, 3 . . . control terminal, 31 . . . control information display unit, 4 . . . controlled server group (plural physical servers, plural virtual servers)

What is claimed is:

1. A non-transitory recording medium storing a server control program for distributing a plurality of virtual servers to a plurality of physical servers, the server control program causing a computer to execute:

predicting a second load of each of the virtual servers in future based on a first load of each of the plurality of virtual servers in a prescribed time period up to the present;

determining a schedule to distribute the plurality of virtual servers to the plurality of physical servers based on the second load of each of the virtual servers and an initial value of a number of physical servers where the initial value is determined by a total of the second loads of the plurality of virtual servers and a product of a prescribed proportion and a total of processing capacities of the plurality of physical servers, the determining being performed so that a total of the second loads of one or more of the plurality of virtual servers distributed to an individual physical server is within an acceptable range of a proportion with respect to processing capacity of the individual physical server where the acceptable range is set by an upper limit greater than the prescribed proportion and a lower limit less than the prescribed proportion; and issuing an instruction to distribute a portion or all of the plurality of virtual servers to a portion or all of the plurality of physical servers according to the schedule.

2. The non-transitory recording medium of claim 1, wherein in the predicting the second load, the second load of each of the virtual servers is calculated by performing statistically processing the first load of each of the virtual servers in an operating time period of the virtual servers, from among the prescribed time period.

3. The non-transitory recording medium of claim 1, wherein in the determining the schedule, a failed physical server of the plurality of physical servers is excluded from a target to which the plurality of virtual servers are distributed.

4. The non-transitory recording medium of claim 1, wherein the server control program further causes the computer to issue an instruction to power off a physical server to which no virtual server is distributed as a result of distribution according to the schedule.

5. A control server to distribute a plurality of virtual servers to a plurality of physical servers, the control server comprising:

a processor configured to predict a second load of each of the virtual servers in future based on a first load of each of the plurality of virtual servers in a prescribed time period up to the present, to determine a schedule to distribute the plurality of virtual servers to the plurality of physical servers based on the second load of each of the virtual servers and an initial value of a number of physical servers so that a total of the second loads of one or more of the plurality of the virtual servers distributed to an individual physical server is within an acceptable range of a proportion with respect to processing capacity of the individual physical server where the initial value is determined by a total of the second loads of the plurality of virtual servers and a product of a prescribed proportion and a total of processing capacities of the plurality of physical servers, and the acceptable range is set by an upper limit greater than the prescribed proportion and a lower limit less than the prescribed proportion, and to issue an instruction to distribute a portion or all of the plurality of virtual servers to a portion or all of the plurality of physical servers according to the schedule.

6. The control server of claim 5, wherein the processor calculates the second load of each of the virtual servers by performing statistically processing the first load of each of the virtual servers in an operating time period of the virtual servers from among the prescribed time period.

7. The control server of claim 5, wherein the processor excludes a failed physical server of the plurality of physical servers from a target to which the plurality of virtual servers are distributed.

8. The control server of claim 5, wherein the processor further issues an instruction to power off a physical server to which no virtual server is distributed as a result of distribution according to the schedule.

9. A virtual server distribution method executed by a control server to distribute a plurality of virtual servers to a plurality of physical servers, the virtual server distribution method comprising:

predicting a second load of each of the virtual servers in future based on a first load of each of the plurality of virtual servers in a prescribed time period up to the present;

determining a schedule to distribute the plurality of virtual servers to the plurality of physical servers based on the second load of each of the virtual servers and an initial value of a number of physical servers where the initial value is determined by a total of the second loads of the plurality of virtual servers and a product of a prescribed proportion and a total of processing capacities of the plurality of physical servers, the determining being performed so that a total of the second loads of one or more of the plurality of virtual servers distributed to an individual physical server is within an acceptable range of a proportion with respect to processing capacity of the individual physical server where the acceptable range is set by an upper limit greater than the prescribed proportion and a lower limit less than the prescribed proportion; and issuing an instruction to distribute a portion or all of the plurality of virtual servers to a portion or all of the plurality of physical servers according to the schedule.

10. The virtual server distribution method of claim 9, wherein in the predicting the second load, the second load of each of the virtual servers is calculated by performing statistically processing the first load of each of the virtual servers in an operating time period of the virtual servers from among the prescribed time period.

11. The virtual server distribution method of claim 9, wherein in the determining the schedule, a failed physical server of the plurality of physical servers is excluded from a target to which the plurality of virtual servers are distributed.

12. The virtual server distribution method of claim 9, further comprising issuing an instruction to power off a physical server to which no virtual server is distributed as a result of distribution according to the schedule.

* * * * *

UNITED STATES PATENT AND TRADEMARK OFFICE
CERTIFICATE OF CORRECTION

PATENT NO. : 8,782,652 B2  
APPLICATION NO. : 13/297840  
DATED : July 15, 2014  
INVENTOR(S) : Hiroyuki Takami Page 1 of 1

It is certified that error appears in the above-identified patent and that said Letters Patent is hereby corrected as shown below:

In the Specification

Column 1, Lines 4-8, Delete "CROSS REFERENCE TO RELATED APPLICATION(S)
This application is a continuation of PCT application PCT/JP2009/002421, which was filed on Jun. 1, 2009." and insert -- CROSS-REFERENCE TO RELATED APPLICATION
This application is a continuation application of International PCT Application No. PCT/JP2009/002421, which was filed on June 1, 2009, the contents of which are hereby incorporated by reference. --, therefor.

In the Claims

Column 18, Line 21, In Claim 5, before "virtual" delete "the".

Signed and Sealed this  
Fourth Day of November, 2014

Michelle K. Lee  
*Deputy Director of the United States Patent and Trademark Office*